No. 833,772. PATENTED OCT. 23, 1906.
F. H. CHEYNE.
SPEED DIFFERENTIATOR.
APPLICATION FILED FEB. 17, 1904.
2 SHEETS—SHEET 1.
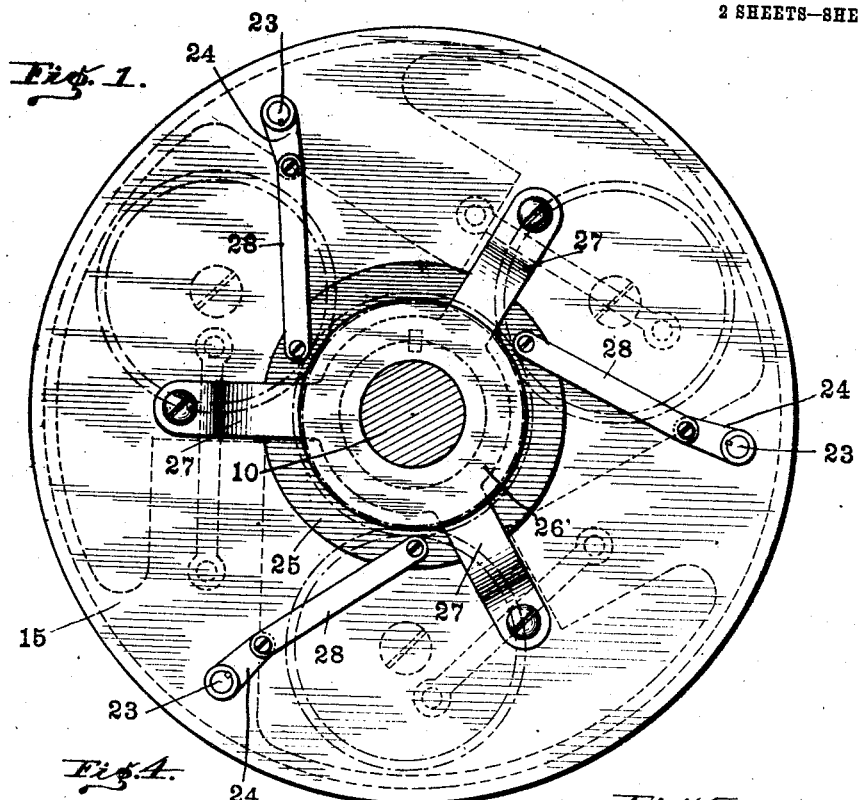
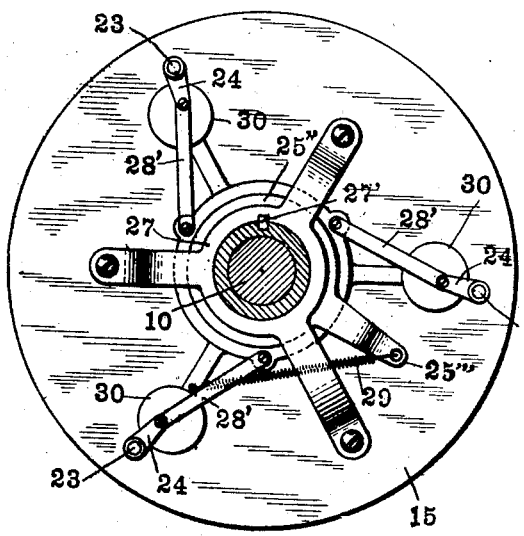
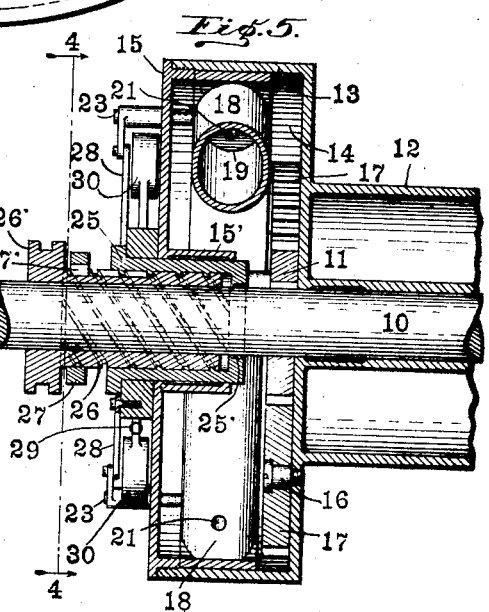
Witnesses
Frank A. Sahle
J. A. Walsh
Inventor
Frederick H. Cheyne
By
Bradford Hood
Attorneys

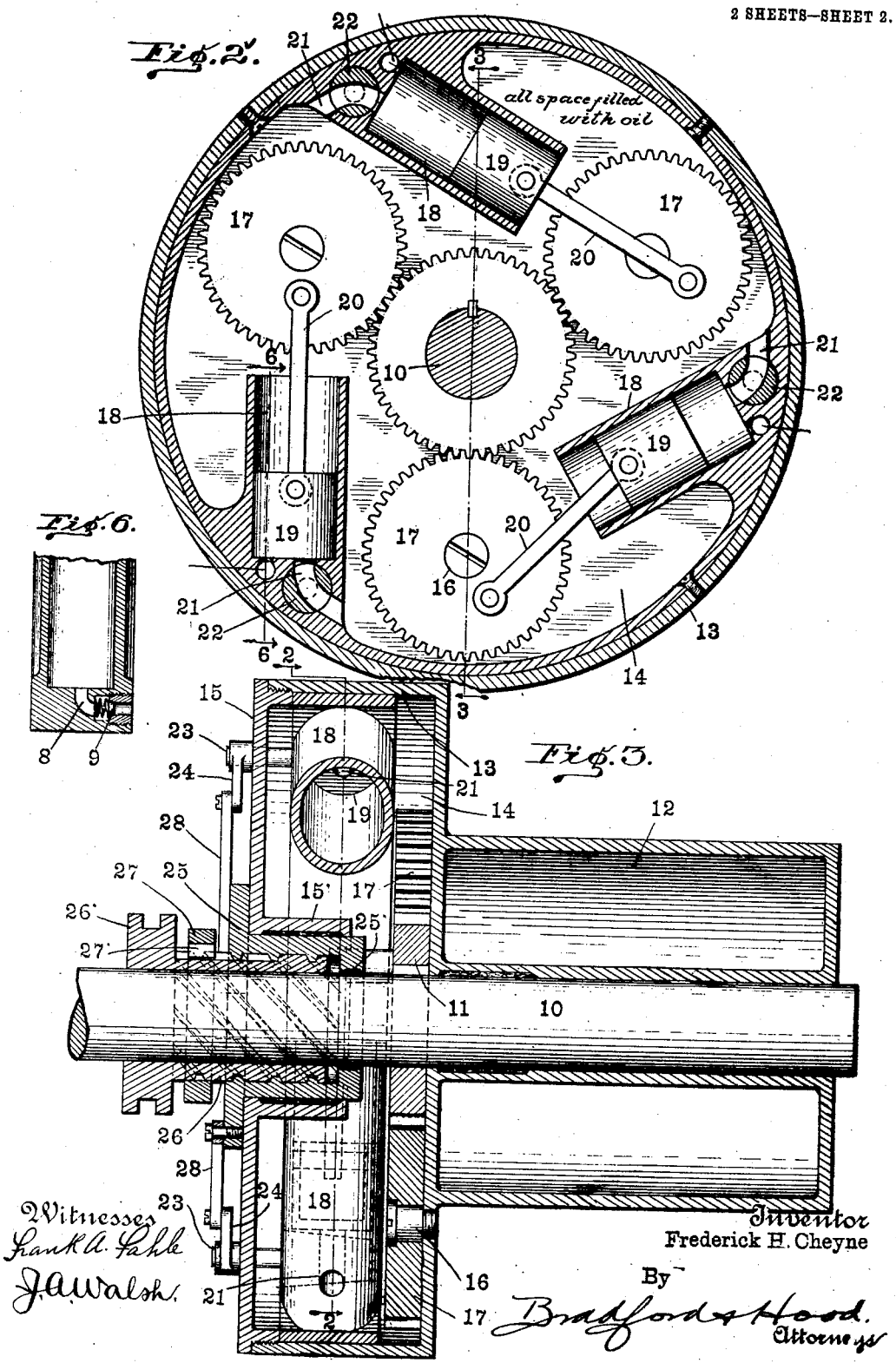

250
UNITED STATES PATENT OFFICE.

FREDERICK H. CHEYNE, OF INDIANAPOLIS, INDIANA.

SPEED-DIFFERENTIATOR.

No. 833,772. Specification of Letters Patent. Patented Oct. 23, 1906.

Application filed February 17, 1904. Serial No. 194,015.

*To all whom it may concern:*

Be it known that I, FREDERICK H. CHEYNE, a citizen of the United States, residing at Indianapolis, in the county of Marion and State of Indiana, have invented certain new and useful Improvements in Speed-Differentiators, of which the following is a specification.

The object of my invention is to provide a compact readily-controllable device by means of which the speed ratio between a driving and a driven part may be readily yet positively controlled without the intervention of separate series of connecting trains of gears.

The accompanying drawings illustrate my invention.

Figure 1 is a front elevation of a device embodying my invention; Fig. 2, a transverse section on line 2 2 of Fig. 3; Fig. 3, an axial section on line 3 3 of Fig 2; Fig. 4, a front elevation of a slightly-modified form provided with an automatic speed-controlled governor, the view being taken on a line 4 4 of Fig. 5. Fig. 5 is an axial section of the parts shown in Fig. 4, and Fig. 6 a section on line 6 6 of Fig. 2.

In the drawings, 10 indicates a shaft to which is keyed a gear 11. Journaled on the shaft adjacent gear 11 is a pulley 12, provided at the end adjacent gear 11 with an overhanging flange 13, thus forming a chamber 14, the end of which is closed by a suitable plate 15. Journaled upon suitable pins 16 within the chamber 14 and upon the pulley 12 are planetary gears 17, which mesh with the gear 11. Arranged within chamber 14 adjacent each gear 17 is a cylinder 18, within which is mounted a piston 19, connected to the adjacent gear 17 by a pitman 20.

In the drawings one end of each cylinder 18 is shown open, and the opposite end is provided with a discharge or passage way 21. Mounted in each passage-way 21 is a valve 22, the stem 23 of which is projected through plate 15 and provided with an operating-arm 24. Each cylinder 18 is also provided with an inlet-port 8, covered by a suitable check-valve 9, Fig. 6.

The plate 15 is provided with a central hub 15' of considerably greater internal diameter than shaft 10, and journaled in said hub is a thimble 25, which is both rotatable with the pulley 12 and also angularly adjustable therein. In order that the chamber 14 may be oil-tight, thimble 25 is provided at its inner end with a tight packing 25', engaging shaft 10, and the joint between the thimble and hub 15 is also packed. The thimble 25 is provided with internal spiral threads or with a pin engaging suitable spiral threads formed in a sleeve 26, journaled upon shaft 10 and provided at its outer end with a peripherally-grooved head 26', which may be engaged by a suitable shifting yoke. (Not shown.) In order that the sleeve 26 and thimble 25 may be positively rotated with the pulley 12, I secure to plate 15 a spider 27, to which the sleeve 26 is keyed by a key 27'. Pivoted to each valve-arm 24 is one end of a link 28, the opposite end being pivoted to the thimble 25, the arrangement being such that by shifting sleeve 26 axially thimble 25 may be adjusted angularly, and thus through the links 28 shift the valves 22, so as to regulate the size of the passage-ways 21. The construction shown in Figs. 4 and 5 is identical with that already described except that the thimble 25'', which corresponds with the thimble 25 in Fig. 3, is provided with a single arm 25''', to which is secured one end of a spring 29, the opposite end of said spring being secured to an inertia governor member 30, which is sleeved upon the thimble 25''. The links 28' (corresponding to links 28 of Fig. 3) are then pivoted to the inertia governor member instead of to the thimble 25''.

In operation the chamber 14 is filled with oil, the oil filling all of the cylinders 18 and the passage-ways 21. If the sleeve 26 be shifted so as to turn thimble 25 to the position shown in Fig. 1, the valves 22 will close the passages 21, so that if power be applied to the shaft 10 the first inclination will be for gear 11 to rotate the gears 17; but this rotation will be prevented by reason of the incompressibility of the oil or other fluid in the cylinder 18 in front of the piston 19, so that the gears 17 are substantially locked against rotation and are thereupon revolved as planetary gears about the shaft 10, carrying the pulley 12 with them, the whole mechanism thus rotating as a unit. If a slower speed of the pulley is desired, sleeve 26 is shifted upon the shaft so as to rotate thimble 25 in the desired direction to open the valves 22 the desired amount, thus permitting a flow of oil through the passage-ways 21, so that the pistons 19 may yield, according to the amount of opening of the valve, and thus permitting rotation of the gears 17 about their axes, and therefore permitting the pulley 12 to lag behind. If the passage-ways 21 and the openings through the valve 22 are of sufficient dimensions to permit free flow of fluid therethrough, the pulley 12 may remain stationary, so that any variation of speed between zero and the maximum speed of the shaft 10 may be produced.

It will be noticed that the same operation takes place if the pulley 12 be made the driving element instead of the driven element, the maximum speed of the driven element taking place when the gears are locked together by reason of the closing of the valves 22.

In the construction shown in Figs. 4 and 5 by varying the relation of the thimble 25' to the inertia element 30 to regulate the tension of spring 29 any desired speed may be automatically maintained, the inertia element shifting according to the variations of speed of the driving element to automatically control the position of the valves, and thus determine the ratio of speed.

It will be noticed that the apparatus may be used as a clutch having all the desirable qualities of a friction-clutch, yet without resultant heating.

I claim as my invention—

1. In a speed-changing device, the combination of a shaft, a gear keyed thereto, a pulley journaled on said shaft, a planetary gear carried by said pulley and meshing with the first-mentioned gear, a cylinder and piston carried by the pulley, a connection between one of said last-mentioned parts and the planetary gear, whereby rotation of said planetary gear would cause relative movement between the cylinder and piston, a liquid-container communicating with said cylinder, a valve controlling said communication, and means for holding the valve in desired positions of adjustment.

2. In a speed-changing device, the combination of a shaft, a gear keyed to said shaft, a pulley journaled on said shaft and provided with a fluid-chamber, a planetary gear carried by said pulley and meshing with the first-mentioned gear within the fluid-chamber, a cylinder mounted in said fluid-chamber and communicating therewith, a piston mounted in said chamber and connected to the planetary gear, a valve controlling communication between the cylinder and fluid-chamber, and means for controlling the position of said valve and holding same in desired positions of adjustment.

3. In a speed-changing device, the combination of a shaft, a gear keyed to said shaft, a pulley journaled on said shaft and provided with a fluid-chamber, a planetary gear carried by said pulley and meshing with the first-mentioned gear within the fluid-chamber, a cylinder mounted in said fluid-chamber, and communicating therewith, a piston mounted in said chamber and connected to the planetary gear, a valve controlling communication between the cylinder and fluid-chamber, a thimble journaled about said shaft, connections between said thimble and the valve whereby rotation of the thimble will operate the valve, a sleeve journaled on the shaft, and intermediate connections between said sleeve and thimble whereby axial movement of the sleeve will produce angular movement of the thimble, for the purpose set forth.

In witness whereof I have hereunto set my hand and seal, at Indianapolis, Indiana, this 13th day of February, A. D. 1904.

FREDERICK H. CHEYNE. [L. S.]

Witnesses:
 ARTHUR M. HOOD,
 JAMES A. WALSH.